United States Patent [19]
Hofer

[11] 3,962,023
[45] June 8, 1976

[54] APPARATUS FOR APPLYING HANDLES TO PLASTIC BAGS

[75] Inventor: Waldemar Hofer, Sherwood Park, Canada

[73] Assignee: MacKenzie Trading Co. Ltd., Edmonton, Canada

[22] Filed: Mar. 27, 1975

[21] Appl. No.: 562,705

[30] Foreign Application Priority Data
July 17, 1974 Canada.................................. 205110

[52] U.S. Cl. ................................................. 156/514
[51] Int. Cl.² ............................................. B32B 31/00
[58] Field of Search............................ 156/513, 514

[56] References Cited
UNITED STATES PATENTS

| | | | |
|---|---|---|---|
| 3,069,303 | 12/1962 | Scholle .............. | 156/513 |
| 3,440,124 | 4/1969 | Schwarzkopf.............. | 156/513 |
| 3,880,700 | 4/1975 | Ritch et al. ................ | 156/514 |

*Primary Examiner*—Douglas J. Drummond

[57] ABSTRACT

Apparatus for applying plastic handles to tubular plastic bag stock. A drive mechanism feeds the bag stock through the apparatus intermittently in discrete lengths and each length corresponds to the length of a bag. A float piece is positioned inside the bag stock and is restrained to remain in a predetermined position as the bag stock is fed over the float piece by the drive mechanism. A handle transport mechanism feeds pairs of handles to respective positions one at either side of the float piece immediately adjacent respective outer sides of the bag stock and a clamping mechanism moves axially to apply a compressive force whereby the bag stock is clamped between respective handles and the float piece. A cutter is movable to pierce the bag stock inside the handles and an actuator is provided to move the clamping mechanism and the cutter assembly in sequence to first create said compressive force and then to pierce the bag stock. The float piece has a central main portion adapted to combine with the restraining means and a pair of relatively thin wing members dependent from the main portion in a substantially common plane. Heating elements and associated parts are provided to heat the bag stock for welding the bag stock to the handles from within the bag stock.

15 Claims, 11 Drawing Figures

APPARATUS FOR APPLYING HANDLES TO PLASTIC BAGS

This invention relates to improved apparatus for making plastic bags from tubular bag stock, each of the plastic bags having a pair of handles attached one to each side of the bag and surrounding respective hand openings in the sides of the bag.

In the past plastic bags have been made by first preparing tubular bag stock which is then sealed and severed at intervals corresponding to a bag length. The seal forms a bottom of a bag and the severing operation takes place adjacent the seal to define the open top of the next bag coming off the bag stock. In many instances it is preferable to have handles of some sort on the bag so that the bag can be used as a carrier for articles. An advantage of such a structure is that it can be used for advertising. When a purchaser buys an item from a store, he is given such a bag having advertising material on the side which is displayed by the purchaser in carrying the bag.

Although many types of handles have been used on plastic bags, one type which has found favour is a peripheral handle which is welded about a hand opening in a bag side. Apparatus designed to make bags of this type having such handles is shown in U.S. Pat. No. 3,440,124 to Schwartzkopf. This apparatus first punches grip holes in bag stock and then transports the bag stock to a location in which the peripheral handles are applied above the grip holes. The handles are supplied to this location in strip form and must be severed from the strip when the handles are attached to the bag stock. The location of the grip holes relative to the handles is necessarily critical in order to ensure that the grip hole is properly surrounded by a handle. The Schwartzkopf apparatus therefore suffers from two disadvantages. Firstly, the grip hole once formed must then be located for receiving handles and secondly the handles must be supplied initially in strip form and then severed without damaging the bag stock.

Another apparatus for use in applying such handles is shown in U.S. application, Ser. No. 374,575, filed on June 27, 1973, now U.S. Pat. No. 3,880,700. This copending application teaches improvements over the Schwartzkopf apparatus in that a combined cutting and welding mechanism is used to both penetrate the bag stock and to weld handles to sides of the bag stock while the bag stock is stationary. The improved mechanism includes a float piece which is restrained to remain in a predetermined position as the bag stock is fed over the float piece by the drive mechanism and a handle transport mechanism feeds pairs of handles to respective positions at either side of the float piece adjacent respective sides of the bag stock. The combination cutting and welding mechanism includes a double-acting head having a cutter which penetrates the bag stock and a pressure plate which applies a compressive pressure to compress the handles against the bag sides which are heated by platens forming parts of the float piece. The platens are heated electrically when the cutter penetrates the bag stock.

While the apparatus described in the said co-pending application operates satisfactorily under certain circumstances, it has been found that the performance of the apparatus can be improved by incorporating improvements according to the present invention. In particular, an improved float is provided wings which limit the possibility of the tubular bag stock distorting as it passes over the float. This distortion was due to the fact that the thickness of the float effectively reduces the width of the bag stock as it passes over the float with a consequent tendency for the bag stock to become distorted or pleated in subsequent parts of the apparatus. This and other advantages of the new apparatus will be better understood with reference to the following description and drawings in which:

Figures 1, 2, 3:
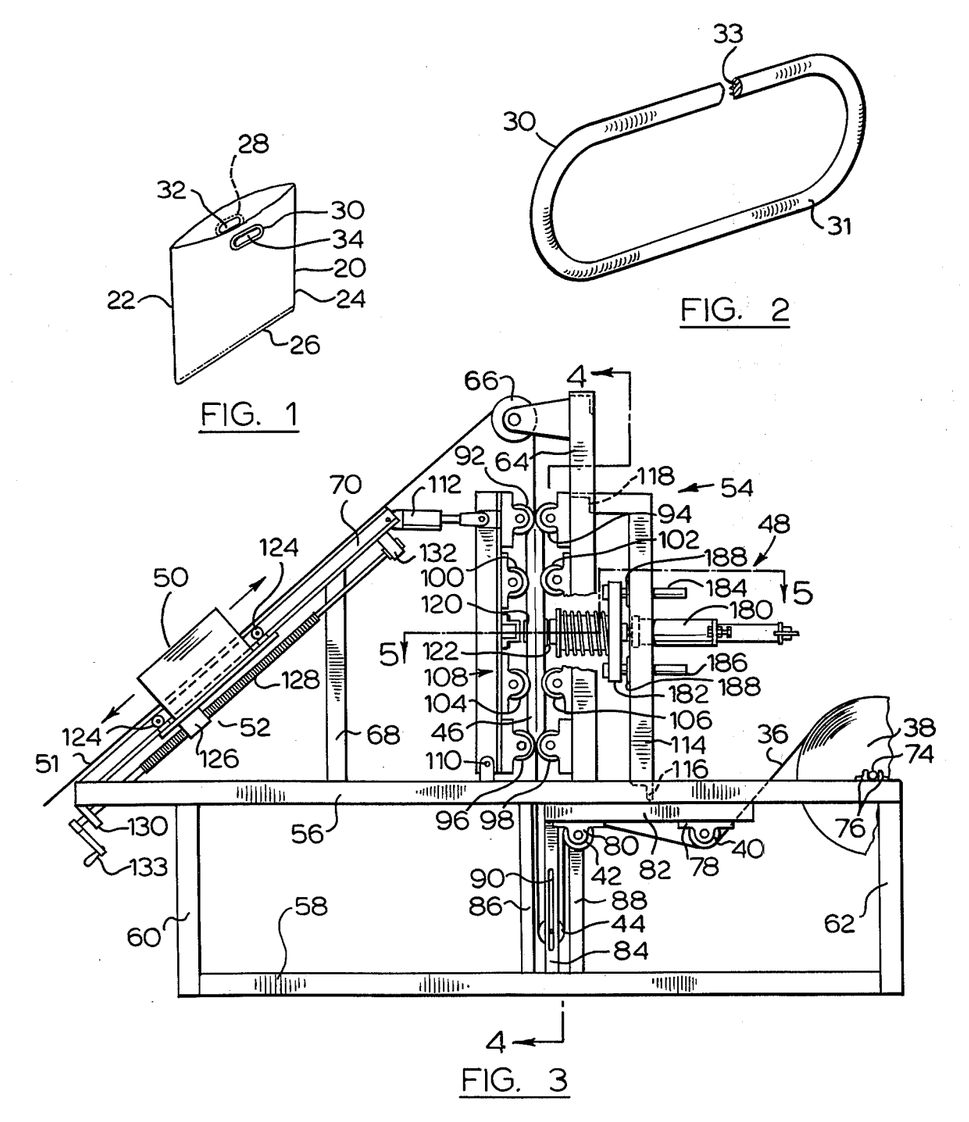
FIG. 1 is a perspective view of a typical bag made by apparatus according to the invention.
FIG. 2 is a perspective view of a handle used on the bag with part of the handle broken away to indicate a cross-section of the handle.
FIG. 3 is a side view of a preferred embodiment of apparatus according to the invention for making bags such as that illustrated in FIG. 1.

Reference is made first to FIG. 1 which shows a plastic bag 20 made by apparatus according to the invention.

The bag is formed from tubular bag stock having creases defining longitudinal edges 22, 24 and welded transversely at a bottom 26 of the bag 20. A pair of plastic handles 28, 30 are welded to respective sides of the bag adjacent the open top of the bag and openings 32, 34 are formed in the walls of the bag within the confines of the handles 28, 30. These handles are attached to outer surfaces of the bag walls by welding from inside the bag. The form of the handles is illustrated in FIG. 2 which shows the handle 30. This handle is typically generally oval and has a rounded outer surface 31 and a generally flat inner surface 33. This latter surface can have small projections dependent from it or, as has been found preferable, the surface can have a zig zag or criss-cross pattern of fine raised ribs. These ribs decrease the surface area for welding and thereby ensure an adequate welding temperature where these ribs will eventually touch the bag in the welding operation.

Reference is now made to FIG. 3 which shows apparatus incorporating the invention for making the bag 20 shown in FIG. 1. Tubular bag stock 36 leaves the supply roll 38 and passes under and over respective first and second feed rollers 40, 42 before passing under a dancer roller 44. The bag stock then passes upwardly about a central float piece 46 which forms part of a combination cutting and welding mechanism 48 to both form openings corresponding to openings 32, 34 (FIG. 1) and to attach handles such as handles 28, 30 (FIG. 1). The bag stock is stationary while this operation takes place. Next the bag stock with handles attached is drawn upwardly by an intermittent drive mechanism 50 which incorporates a finishing station. As will be described, the mechanism 50 is adjustable along the path followed by the bag stock. The mechanism can take any conventional form and can also be similar to the type shown in applicants aforesaid co-pending application. The mechanism operates to move the bag stock through one bag length at a time to allow the mechanism 48 to be actuated to apply handles to the bag stock each time the bag stock is stationary. When the bag stock stops after being advanced by the mechanism 50, the finishing station simultaneously both cuts the bag stock to separate a finished bag and welds the remaining bag stock to form a weld such as weld 16 (FIG. 1). This weld is on the exposed end of the bag stock to thereby seal the bottom of the next bag. A finished bag 51 is shown diagrammatically leaving the apparatus. Mechanism 50 is mounted on an adjuster 52 so that in the event that the distance between the handles and the bottom of the bag varies outside a predetermined dimensional allowance, then the mechanism 50 can be moved along the path of the bag stock to bring this distance back within the allowance.

Parts of the apparatus are attached to a support structure 54 which consists essentially of a pair of side frames interconnected by cross members. One of the side frames can be seen in FIG. 3 and this consists of upper and lower main members 56, 58 interconnected by end uprights 60, 62. A main upright 64 extends from adjacent the centre of member 56 and supports a guide roller assembly 66 which receives the bag stock as its completes its vertical path from the dancer roller 44 and the float piece 46.

A secondary upright 68 extends from the upper main member 56 intermediate the end upright 60 and the main upright 64. Upright 68 supports one of a pair of inclined tracks 70 which terminates at its lower end at an end of the upper main member 56. Track 70 is adapted to receive mechanism 50 as will be described. It will be appreciated that each of the parts described with reference to the frames seen in FIG. 3 is duplicated on the other side of the frame so that each of these parts represents a pair of parts. It will be evident that other parts which are to be described also represent pairs of parts.

Figure 4:
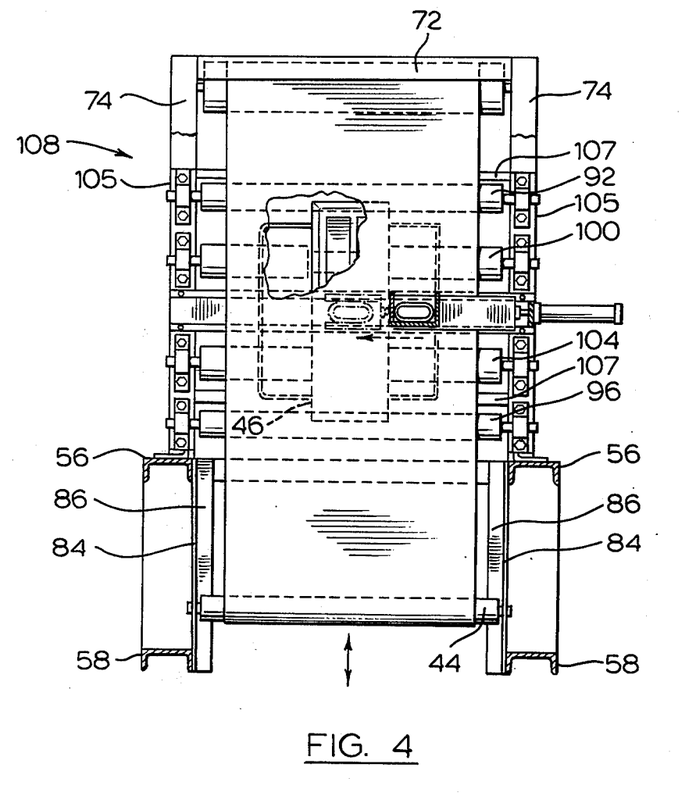
FIG. 4 is a sectional end view on line 4—4 of FIG. 3.

Transverse connecting members such as member 72 seen at the top of FIG. 4 are provided and spaced around the support structure to interconnect the side frames.

Reference is now made to those parts of the apparatus which are used to support and guide the bag stock 36 through the apparatus. The supply roll 38 is mounted on a shaft 74 which is located relatively loosely between pairs of stops 76 at either side of the shaft 74. The feed rollers 40, 42 are journalled in respective pairs of bearing blocks 78, 80 mounted on spacer members 82 on the underside of the respective upper main members 56. Bag stock 36 leaves the second feed roller 42 and passes vertically downwards to dancer roller 44 before passing vertically upwards towards the float piece 46. As seen in FIGS. 3 and 4, the dancer roller 44 is mounted between a pair of upright elements 84 which extend vertically between respective pairs of the upper and lower main members 56, 58. Pairs of rigidifying outer elements 86, 88 also extend between the main members 56, 58 to further rigidify the support structure 54.

The upright elements 84 define vertically extending slots 90 to permit the dancer roller 44 to move vertically for thereby applying a relatively constant tension to the bag stock and to take up variations in the length of the bag stock between the mechanism 48 and the supply roll 38.

As also seen in FIGS. 3 and 4, the central float piece 46 is located vertically by respective pairs of upper and lower rollers 92, 94 and 96, 98 and is located transversely by respective pairs of intermediate rollers 100, 102 and 104, 106. The shape of these locating rollers can be better seen in FIG. 4 which shows one of each pair. The upper and lower rollers are cylindrical whereas the intermediate rollers have respective central portions of reduced diameter to define shoulders for locating sides of the float piece 36. The locating rollers are proportioned and positioned so that the float piece can move vertically and transversely within defined small limits so that as the bag stock passes over the float piece there is little likelihood of the bag stock causing the float piece to jam in the rollers.

The locating rollers shown in FIG. 4 are mounted on an adjustable roller carrier 108 which, as seen in FIG. 3, is coupled by pivots 110 to the respective upper main member 56. The roller carrier 108 has side members 105 interconnected by transverse braces 107 (FIG. 4) and is normally in a vertical position in use. However, the carrier can be rotated away from the bag stock about pivots 110 by a pair of actuators 112 coupled at their ends to respective ends of inclined tracks 70 and to carrier side members 105. Consequently, by energizing actuators 112, it is possible to tilt the roller carrier 108 and associated rollers away from the bag stock for maintaining and setting up the apparatus as will be described. Rollers which correspond to those mounted on the carrier 108 are mounted on the main upright 64 of the support structure 54.

As better seen in FIG. 3, the combination cutting and welding mechanism 48 is coupled to a central bracket 114 which extends vertically from a transverse connecting member 116 attached to upper main members 56. The upper end of bracket 114 is attached to a transverse member 118 which extends between main uprights 64. The mechanism 48 together with a transport mechanism for positioning handles 120, 122 will be more fully described after completing the description of parts of the apparatus which are used to guide the bag stock. At this point it is sufficient to indicate that when the bag stock 36 leaves the central float piece 46, handles have been attached by the mechanism 48 at intervals corresponding to bag lengths.

On leaving the central float piece 46, the bag stock 36 moves vertically and passes over the guide roller assembly 66 before meeting the intermittent drive mechanism 50 on the adjuster 52. As already mentioned, the drive mechanism 50 can take any form suitable for driving the bag stock intermittently in bag lengths. Each time the bag stock stops a further pair of handles are attached by the mechanism 48 and then the bag stock is transported through a further bag length by the mechanism 50 before a further pair of handles are attached to the stock. Also, each time the bag stock stops, a finishing station within the mechanism 50 cuts a finished bag from the stock and at the same time welds the exposed ends of the stop to form a new bottom in the next bag. As a result individual bags 51 leave the mechanism 50 intermittently.

An important consideration in locating the mechanism 50 is that variation can take place in the distance followed by the bag stock in passing from the mechanism 48 to the drive mechanism 50. This can be due to variations in the strength of the bag stock caused by temperature variations, variations in thickness and the like. Because this distance must be maintained, the adjuster 52 is incorporated in the apparatus to move the drive mechanism 50 along the track 70. The mechanism 50 includes pairs of wheels 124 contained in respective tracks 70 at either side of the mechanism 50. These wheels locate the mechanism and an internally threaded portion 126 of the mechanism is in engagement with an elongated threaded rod 128 contained between end members 130, 132 on the underside of the tracks 70. A handle 133 attached to the rod 128 permits the rod to be rotated for adjusting the position of the mechanism 50 along the path followed by the bag stock 46. Consequently, if an operator observes that the distance between the handles and the bottom of a bag is outside a predetermined dimensional allowance, the operator can then move the mechanism 50 accordingly to effectively change the position of the handles on the finished bags.

Figure 5:
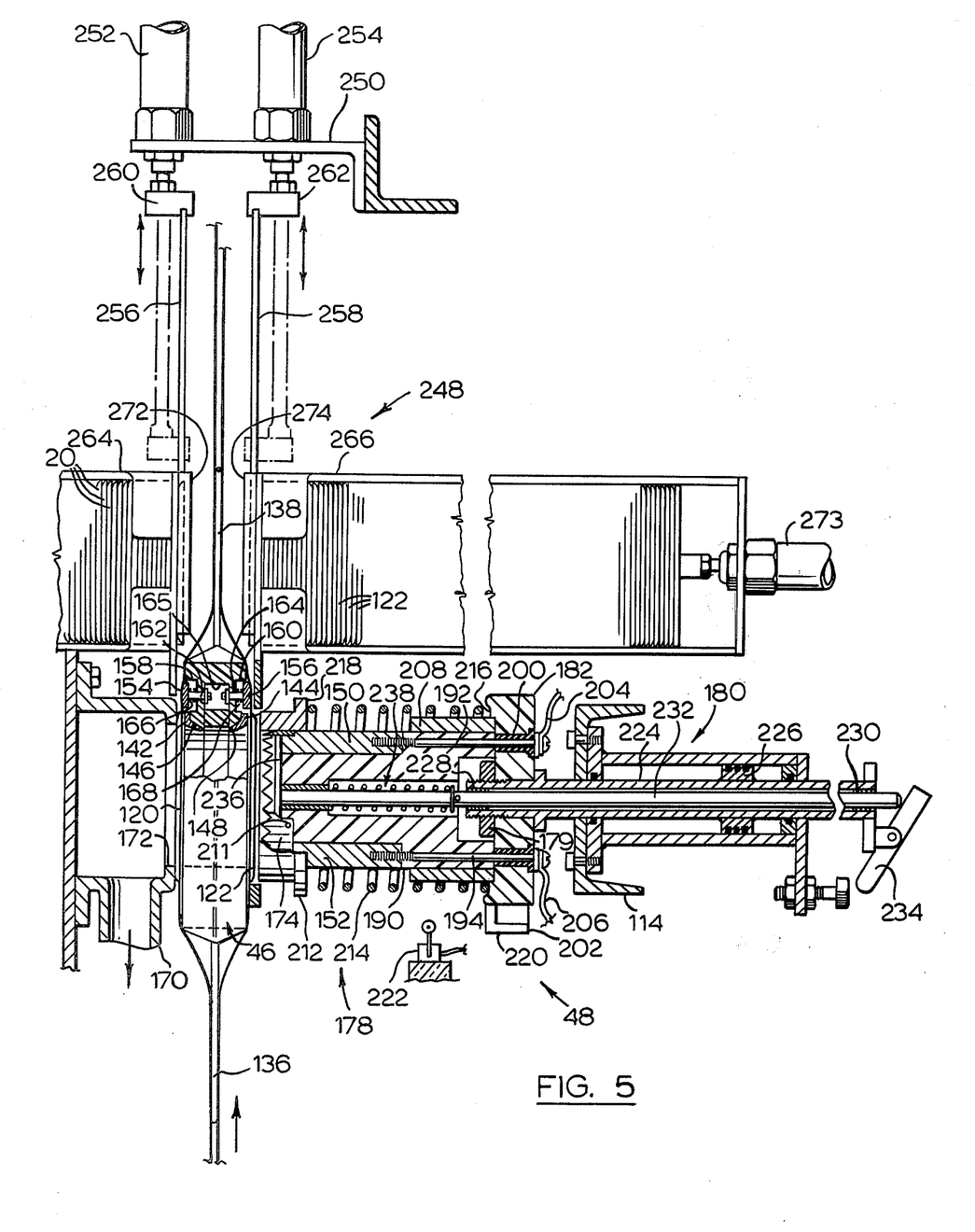
FIG. 5 is a sectional plan view on line 5—5 of FIG. 3 and showing a combined cutting and welding mechanism in a withdrawn position.
Figures 6, 7:
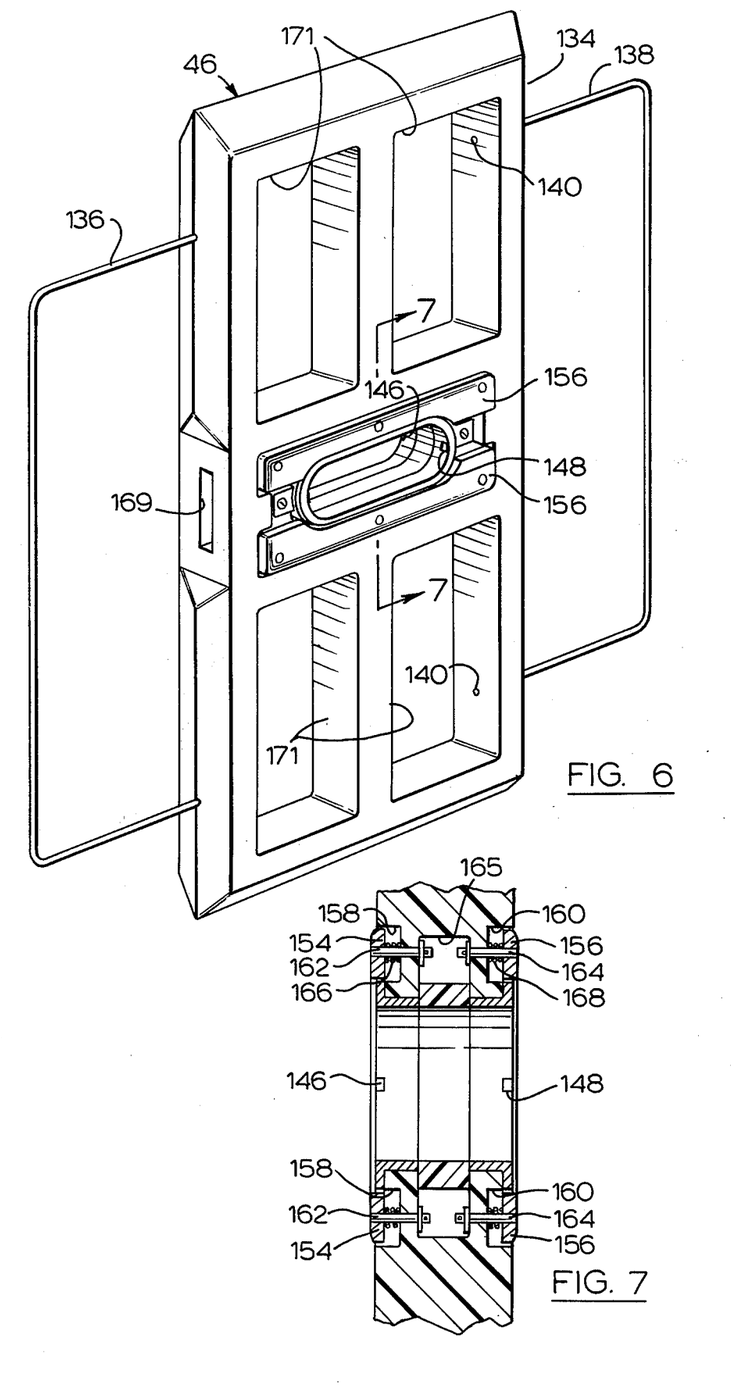
FIG. 6 is a perspective view of a float piece used in the apparatus.
FIG. 7 is a sectional view on line 7—7 of FIG. 7.

Reference is now made to FIGS. 5, 6 and 7 to describe the float piece 46 which forms a part of the combination cutting and welding mechanism 48. The float piece 46 includes a generally rectangular main portion 134 (FIG. 3) having rounded edges to ensure that the bag stock moves smoothly over the piece 46. As previously described, the float piece 46 is located by the rollers associated with the carrier 108 (FIG. 1) and by the corresponding rollers mounted on the main uprights 64.

A pair of peripheral heating elements 142, 144 are attached to a main portion of the float piece 46 and proportioned to correspond in shape to the handles which are to be attached to the bag. The elements 142, 144 have respective resilient contacts 146, 148 for engagement by an electrically conductive shoe 150 (FIG. 5) as will be described. A similar shoe 152 is adapted to be coupled electrically to similar contacts also attached to the heating elements 142, 144 and not shown clearly in the drawings. Pairs of spring-loaded strippers 154, 156 lie adjacent the respective elements 142, 144 for releasing the bag from these elements as will be described. The strippers 154, 156 are housed loosely in pairs of recesses 158, 160 at opposite sides of the float piece 46 and are held in place by a plurality of respective locating pins 162, 164 which pass through the float piece 46 and terminate at an internal cavity 165. This cavity provides clearance to permit the strippers 154, 156 to be deflected inwardly against respective compression springs 166, 168 and the internal ends of the locating pins 162, 164 have structure preventing the pins moving outwardly under the influence of these springs. The cavity 165 is defined on three sides by the main body of the piece 46 and at an inner side by an annular spacer 167. This spacer is entered through a side opening 169 in the piece 46.

The strippers 154, 156 normally sit slightly proud of the respective associated faces of the float piece 46 so that when the handles are presses into engagement with the bag as will be described, these strippers are deflected inwardly. As soon as the compressive force is removed from the handles, the strippers move the bag and handles away from the float piece ready for movement off the float piece by the drive mechanism 50 (FIG. 3).

The main portion 134 of the float piece 46 is of any suitable material which is both light and sufficiently strong to withstand the locating forces created by the rollers which contain the float piece in position. Four openings 171 are provided for lightness in the preferred embodiment which is made from fibreglass or an epoxy resin impregnated material.

It will be appreciated that the width of the bag stock between the roll 38 (FIG. 3) and a point between the dancer roller 44 and the lower rollers 96, 98 remains substantially constant. Also when the bag stock passes over the float piece 46, the resulting separation of the bag stock walls causes a slight reduction in the width of the bag stock. Once the bag stock leaves the float piece 46 it must return to its original width otherwise creasing or pleating will result. It has been found that the bag stock will run smoothly over the float piece and then return to its original width if the float piece includes a pair of wing members 136, 138. These members are generally U-shaped and provide guidance for the bag stock so that the bag stock remains increased.

Each wing is preferably of a polished or plated wire and is simply pushed into suitable openings 140 in the main portion 134. A series of different members 136, 138 can be provided for a variety of bag stock widths or the members can be adjusted by moving them in the openings 140. As a result a single main portion 134 can be used with a number of different bag stock sizes.

Once the material has been cut from within the handles, the mechanism 48 ejects the material into a hollow back stop 170 (FIG. 5) which is coupled to a vacuum supply (not shown) to ensure removal of these pieces. An opening 172 in the back stop is of similar shape to the cup pieces to provide clearance for a cutter 174 which moves through the float piece 46 to cut the bag stock as will be described.

The combination cutting and welding mechanism 48 also includes parts external to the central float piece 46. A triple acting head 178 is attached by a fastener 179 to an actuator 180 mounted on the bracket 114. As better seen in FIG. 3, the head 178 includes a bridge piece 182 to which is attached upper and lower guide rods 184, 186 slidably engaged in suitable bearings 188 attached to bracket 144. The guide rods 184, 186 maintain the proper alignment of the head 178 with the float piece 46.

The head 178 includes a main element 190 of an insulating material such as a phenolic resin which is coupled to the bridge piece 182 by a combination of elongated screws 192, 194 and the previously described conductive shoes 150, 152. These shoes are set in the main element 190 in alignment with respective contacts 146, 148 and the corresponding contacts previously described in the float piece 46. The screws 192, 194 pass through insulated bushings 200, 202 set in the bridge piece 182, and through a rearward part of the main element 190. The screws are threaded into the respective shoes 150, 152 and respective electrical conductors 204, 206 are retained in place by the screws 192, 194 for supplying electrical power from a source (not shown).

The main element 190 is reinforced by metal tubular element 208 which extends about the main element 190 in frictional engagement therewith and is spaced from the conductive shoes 150, 152.

Cutter 174 is attached to a leading end of the main element 190 by suitable screws 211 and is shaped for cutting the bag stock to define openings such as openings 32, 34 (shown in FIG. 1). It will therefore be evident that the cutter is not cylindrical and that consequently the main element 190, and element 208 correspond in shape with the cutter 174.

The head 178 also includes a clamping mechanism 212 which is used to press the handles 120, 122 into contact with the bag stock which is then in turn pressed against the respective heating elements 142, 144. The mechanism 212 includes a compression spring 214 which is located in a circular groove 216 in the bridge piece 182 at one of its ends and at its other end in a similar groove formed in a retainer 218. This retainer is of an electrical insulator material to prevent electrical continuity between the conductive shoes 150, 152 when these shoes slide through the retainer 218 as the cutter 174 severs the bag stock.

Figure 8:
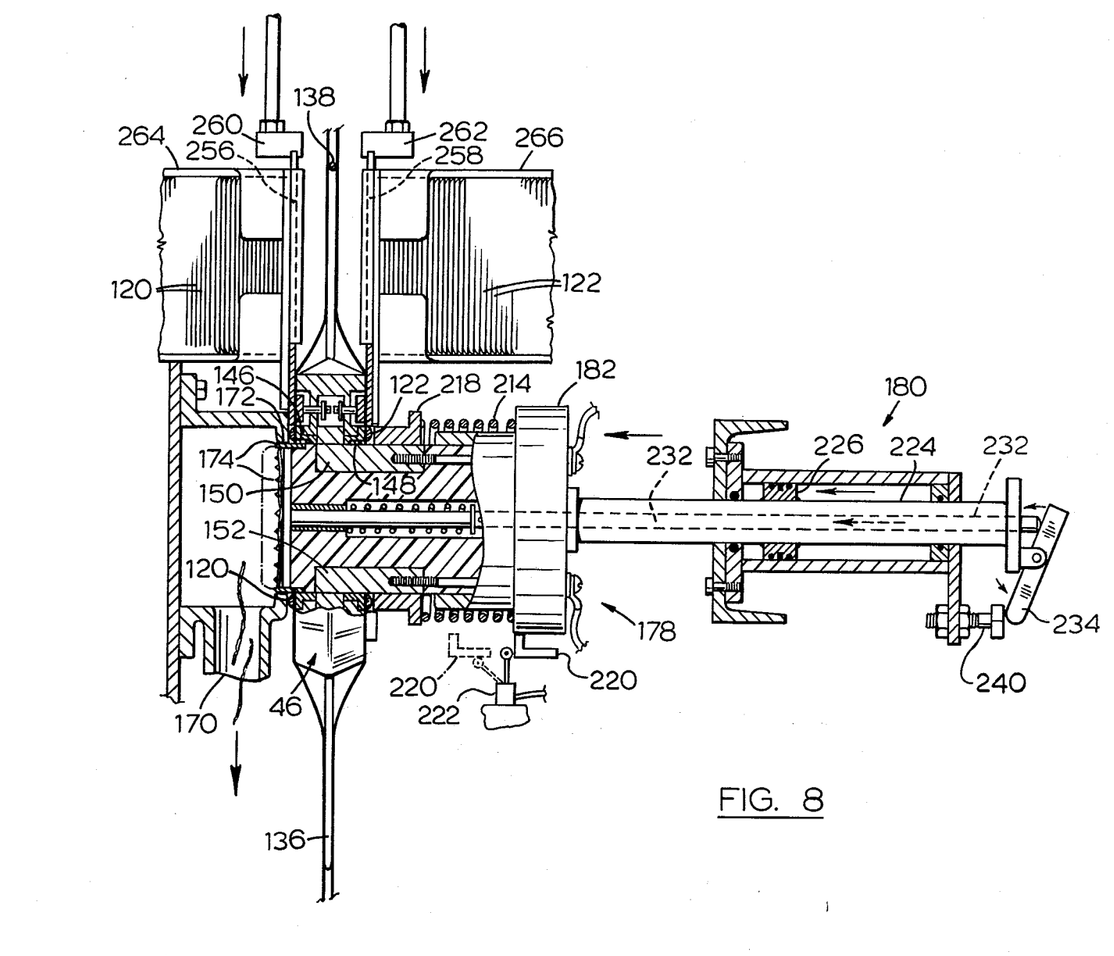
FIG. 8 is a view similar to FIG. 5 showing the mechanism in a partially extended position.

When the actuator 180 causes the head 178 to move forwardly, a forward face of the retainer 218 engages handle 122 and pushes the handle axially along the line of action of the actuator 180. Consequently after a relatively small movement a compressive force is created due to engagement of handle 120 with the back stop 170. Once the head 178 has moved axially to a point where the handles 120, 122 are compressed slightly, further movement of the head results in compression of spring 214 so that the cutter 174 then continues onwardly as it slides through the retainer 218 and on towards the bag stock. As seen in FIG. 8, the cutter continues onwardly and severs the bag stock inside the handles 122 and 120 reaching a position shown in FIG. 8. Before the forward movement of the cutter 174 has stopped, the conductive shoes 150, 152 have made engagement with the contacts 146, 148 and the corresponding contacts aligned with the shoe 152. No electrical power passes from the shoes to the contacts until a striker 220 attached to the bridge piece 182 engages a switch 222 to complete the circuit whereby electrical power is available to the conductors 204, 206 and hence to the elements 142, 144. This arrangement eliminates the possibility of arcing as the shoes 150, 152 meet their respective contacts in the float piece 46. The electrical power continues until the striker 220 leaves the switch 222 to again prevent arcing upon separation. FIG. 6. illustrates the switch 222 about to be engaged by the striker 220.

It will be evident that in a continuous process there is residual heat in the elements 142, 144 so that it is only necessary to bring these elements up to a temperature sufficient to ensure that the handles are welded to the bag stock. The head can then be withdrawn leaving behind openings in the bag stock inside handles 120, 122 on the bag stock.

The triple-acting head 178 has the advantage that it first clamps the bag stock in position next to the bag handles before it cuts the openings in the bag stock. This arrangement ensures accurate registration of the handles relative to the openings and thereby provides a product having an improved appearance which is more acceptable to purchasers of bag of this type. The third function of the head 178 will now be described.

As seen in FIG. 5, the actuator 180 includes a slidable tube 224 attached to the actuator piston 226. Ends of the tube are equipped with bearings 228, 230 for locating an elongated rod 232 which is slidable longitudinally within these bearings. The rod projects beyond the bearing 230 at one end for engagement by an actuating lever 234 and, at the other end the rod is attached to a plate 236 which conforms with the internal shape of the cutter 174 for pushing cut bag stock forwardly through opening 172 in the back stop 170 as will be described.

The ejection mechanism of which the rod 232 is part, also includes a spring biasing assembly 238 contained within the main element 190 and adapted to bias the rod 232 outwardly towards the lever 234. This brings the plate 236 into engagement with a forward end of the main element 190 to hold the ejection mechanism in a first or withdrawn position.

As the head 178 moves into the position shown in FIG. 8, an outward end of the lever 234 engages an adjustable stop 240 thereby creating a turning movement in the lever which brings the lever into engagement with the outer end of the rod 232. Consequently, further movement of the head results in the rod 232 moving forwardly relative to the cutter 174 into a second position to clear cut portions of the bag stock out of the cutter and into the back stop 170.

Figure 9:
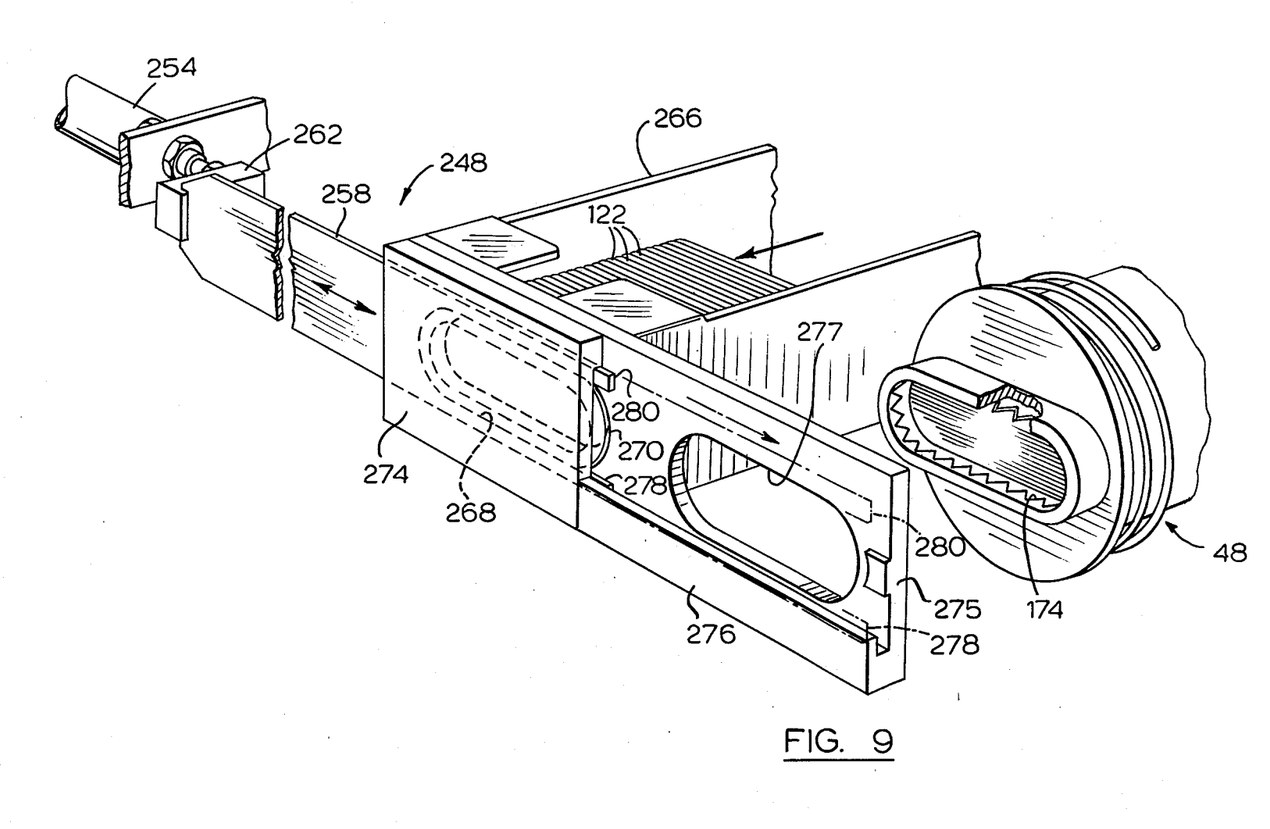
FIG. 9 is a perspective view illustrating the operation of a handle transport mechanism used in the apparatus.
Figure 10:
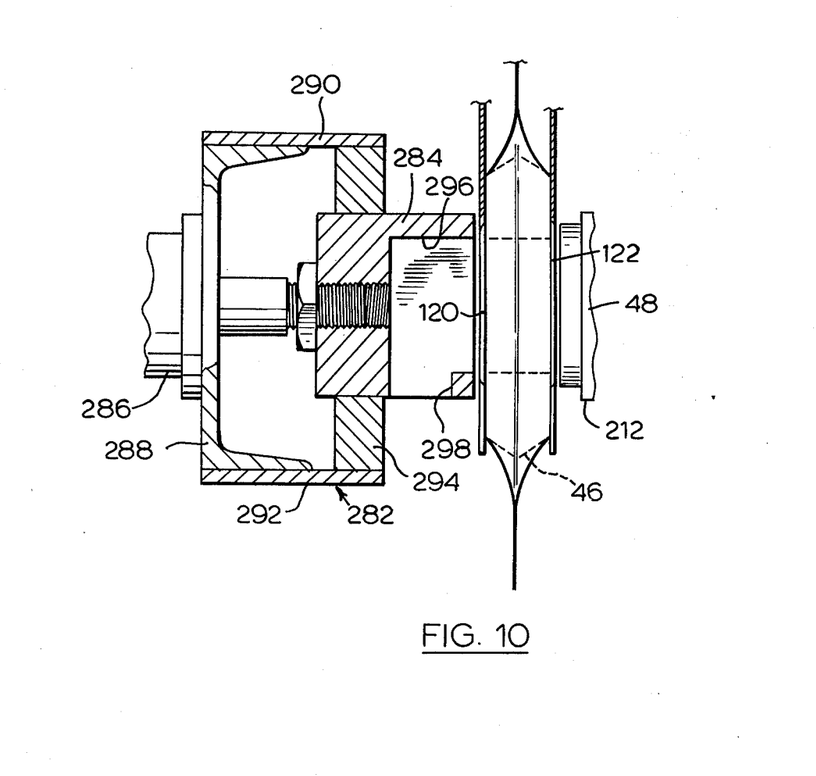
FIG. 10 is a sectional view similar to FIG. 5 and showing an alternative embodiment of a back stop used in the apparatus.

Reference is now made to FIGS. 4, 5 and 9 to describe a transport mechanism 248 which feeds handles 120, 122 into alignment with the cutting and welding mechanism 48 while the bag stock is being transported through a bag length by the drive mechanism 50 (FIG. 3). The transport mechanism 248 is attached to one of the main uprights 64 by a bracket 250. A pair of actuators 252, 254 are attached to this bracket in parallel for operation along respective paths which intersect orthogonally with the line of action of the mechanism 48. Respective carrier plates 256, 258 are connected by couplings 260, 262 to actuators 252, 254 for transporting the handles from respective magazines 264, 266 into the position occupied by handles 120, 122 in FIG. 5. Carrier plate 258 is typical of both plates and is best shown in FIG. 9. The plate terminates at its outer end at a forwardly opening recess 268 shaped to receive a handle 270 from the magazine 266.

Returning to FIG. 5, respective actuators 273 (one of which is seen in part) apply a continuous force tending to move the handles in the magazines 264, 266 towards respective end plates 272, 274. As seen in FIG. 9, when a handle is engaged again against end plate 274, it is in position to be picked up by the carrier plate 258 and slid along a face plate which forms an end of the magazine 266 and which extends beyond the line of action of the mechanism 48. The face plate defines a clearance opening 277 for allowing the cutter 174 to pass through.

A lower guide 276 forms a continuation of the lower part of the plate 274 so that a lower one of a pair of fingers 278, 280 defining the recess 268 is encased at all times. This ensures that an end of this finger cannot become entangled with the bag stock, and also, because this lower guide maintains the bag stock away from the face plate 275 there is little likelihood that the finger 280 will become entangled with the bag stock. Of course this finger could also be encased but it is preferable that it is not so that if a damaged handle becomes lodged in the mechanism adjacent opening 277 it can be removed upwardly.

Reference is again made to FIG. 3 to describe the setting up and use of the apparatus for handling the bag stock 36. Firstly, the various parts of the apparatus as set up generally as shown in FIG. 3 with the exception that the roller carrier 108 is moved into a withdrawn position by energizing actuators 112 to rotate the carrier 108 outwardly about pivots 110. This is to provide access between the sets of rollers used to locate the float piece 46. Next, a supply roll 38 of bag stock 36 is placed in position and bag stock is fed by hand around rollers 40, 42 and dancer roller 44. The bag stock is then brought upwardly and the float piece 46 is entered into the bag stock. Next, the bag stock is drawn past the float piece to a point above the roller carrier 108 and then, when holding the end of the bag stock above the carrier 108 the actuators 112 are energized to rotate the carrier 108 back into position. At this time care is taken to ensure that the float piece 46 is in proper location to permit the carrier 108 to return to the position shown in FIG. 3. The leading end of the bag stock is then fed first around roller assembly 66 before being fed through the intermediate drive mechanism 50. Next, the transport mechanism 248 is actuated to move the handles 120, 122 into position for welding on to the bag stock.

The mechanism 48 now cuts the bag stock and welds a pair of handles to the bag stock as previously described. This mechanism is then withdrawn and carrier plates 256, 258 of the transport mechanism 248 are also withdrawn. The bag stock is then moved through a bag length by the intermittent drive mechanism 50 while the transport mechanism 248 supplies a further pair of handles ready for attachment to the bag stock. The apparatus is now allowed to operate continuously until the first pair of handles reaches the finshing station within the mechanism 50. At this point the position of the first finished bag must be located relative to the finishing station so that this bag is severed at the correct position on the bag. This adjustment is made with the apparatus stationary by operating the adjuster 52. Once the adjustment has been made the apparatus can then run substantially continuously until the supply roll 38 is exhausted. The position of the bag stock relative to the mechanism 50 will be examined periodically and any necessary small adjustment can be made by turning the handle 133 of the adjuster 52.

Although in the preferred embodiment the float piece 46 is restrained by rollers 92 and 94, 100 and 102, 104 and 106, and 96, 98, suitable materials can be chosen to eliminate the need for these rollers. For instance, highly polished metal shoes which allow the bag stock to slide over them can be used in place of the rollers. In general, these rollers are characteristic of many suitable restraining means which permits the bag stock to be drawn over the float piece while at the same time containing the float piece to locate those parts of the cutting and welding mechanism 48 which are within the float piece in alignment with the moving parts of the mechanism.

The form of the bag 20 (FIG. 2) is exemplary of many types of bags which can be fed through the apparatus as bag stock. The apparatus is not limited to one size of bag because the size of the apparatus can be adjusted or changed to accomodate many sizes of bag stock.

It will also be appreciated that the combination cutting and welding mechanism 48 can take many forms. For instance, the clamping mechanism 212 could be actuated axially at one side of the float piece 46 and the cutter could then operate axially from the other side of the float piece ending with the cutter inside the clamping mechanism.

Figure 11:
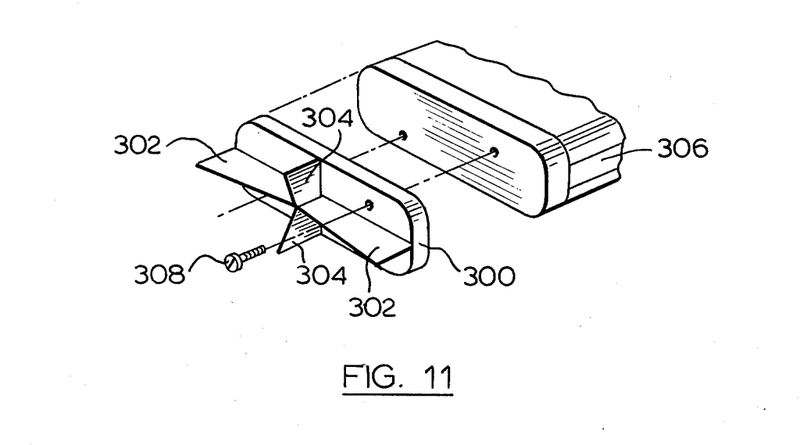
FIG. 11 is a perspective view of an alternative cutter arrangement used in a combined cutting and welding mechanism of the apparatus.

As seen in FIG. 5, stop 170 is fixed and consequently a reaction would be created at this stop only after the actuator 180 has caused the retainer 218 to move the float piece 46 axially relative to the actuator 180 to bring the bag stock into engagement with the stop 170. Consequently the guide rollers on the roller carrier 108 must be positioned relative to the stop 170 to allow this movement of the float piece 46. An embodiment requiring less critical tolerances is shown in FIG. 11. In this embodiment a stop 282 includes a movable end piece 284 attached to an end of an actuator 286 mounted on a structural element 288. Upper and lower elements 290, 292 are attached to the element 288 and terminate at a guide 294 which slidably locates the end piece 284. The actuator 286 is energized at the same time as actuator 180 (FIG. 5) so that the end piece 284 and the mechanism 48 move simultaneously to ensure that adequate forces are developed to apply pressure to the handles independent of movement of the float piece.

The end piece 284 has an opening 296 for receiving the cutter 174 (FIG. 5) snugly and a downwardly opening slot 298 through which cut portions of the bag stock can fall. Preferably suction is applied to the slot 298 to remove the severed portions of bag stock.

Reference is now made to FIG. 11 which shows an alternative embodiment of cutter for use with the invention. As previously described, the mechanism 48 shown in FIG. 5 has a peripheral cutter which cuts a piece out of the bag stock and an ejection mechanism for ensuring that the severed piece of bag stock is moved out of the float piece 46. In some applications it may not be necessary to sever the bag stock completely. Provided that an opening of some kind is formed in the bag and surrounded by a strengthening handle, the bag would be acceptable for general use. Consequently, a cutter such as that shown in FIG. 11 could be used. This cutter consists of a backing plate 300 which supports two pairs of blades, 302 and 304 arranged with the blades 302 horizontal and the blades 304 vertical. Each blade has a forward cutting edge tapering gently from an outer extremity to a junction with the other blades. The backing plate 300 is shaped to fit within a handle so that when the cutter is in use, the blades effectively pierce the bag stock without actually severing a portion of the stock. Nevertheless, a hand grip hole would be provided within the handles to permit using the resulting bag. Consequently, in this application the term "pierce" is intended to include cutting such as that resulting from the use of the cutter 174 (FIG. 5) as well as cutting operations resulting from the use of cutters such as the cutter shown in FIG. 11.

Returning to FIG. 11, the cutter backing plate 300 can be attached to a forward end of a main element 306 which is similar to the element 190 shown in FIG. 5. Suitable screws 308 are used to retain the cutter in this element.

It would be apparent that many forms of cutter can be used consistent with piercing the bag stock to provide a handle opening within the limitations of a handle attached to the bag stock.

What I claim is:

1. Apparatus for applying plastic handles to tubular plastic bag stock the apparatus comprising:
    a drive mechanism adapted to feed the bag stock through the apparatus intermittently in discrete lengths, each one of said lengths corresponding to the length of a bag;

a combination cutting and welding mechanism including a float piece adapted to be positioned inside the bag stock and a head movable axially along a predetermined line of action, the float piece having a central main portion and a pair of relatively thin wing members dependent from the main portion in a substantially common plane lying perpendicularly to said line of action;

means adapted to combine with the main portion of the float piece to restrain the float piece in a position at right angles to said line of action such that the float piece will remain in a predetermined position relative to said line of action as the bag stock is fed over the float piece by the drive mechanism;

a handle transport mechanism adapted to feed pairs of handles to respective positions one at either side of the float piece immediately adjacent respective outer sides of the bag stock with the handles disposed similarly about said line of action and in respective planes which are generally perpendicular to said line of action;

said combination cutting and welding mechanism being operable along said line of action when the bag stock is stationary, and further comprising: a guide means coupled to the head to restrain the head to move axially along said line of action; actuator means coupled to the head for moving the head axially; heating elements coupled to the main portion of the float piece; electrical contacts coupled electrically to the heating elements, these elements being shaped and positioned about said line of action such that upon heating the elements and energising said actuator to apply forces to press the sides of the bag stock between respective handles and heating elements, the respective bag stock sides and handles are welded to one another;

said head comprising: a cutter adapted to pierce the bag stock inside the handles; a retainer slidably mounted for axial movement relative to the cutter; means adapted to bias the retainer outwardly relative to the cutter; and electrically conductive shoes aligned axially with said electrical contacts;

a back stop aligned with the retainer;

said actuator means being operable to move the head between a withdrawn position in which the head is clear of the bag stock and handles, and an extended position in which the cutter projects through both sides of the bag stock and the retainer and back stop apply compressive forces which hold the handles in contact with the bag sides so that the bag sides are then in thermal engagement with the heating elements to thereby weld the bag sides to the handles, the electrical connectors then being in engagement with the respective conductive shoes to complete an electrical circuit for heating the heating elements.

2. Apparatus as claimed in claim 1 and further comprising: a finishing station; and an adjuster coupled to the finishing station and operable to move the finishing station along a path followed by the bag stock whereby the distance along this path between the combination cutting and welding mechanism and the finishing station can be varied to ensure proper registration of the finishing station relative to the handles applied to the bag stock.

3. Apparatus as claimed in claim 1 in which the handle transport mechanism comprises: a pair of aligned magazines adapted to contain a plurality of the handles in face-to-face arrangement; a pair of carrier plates in parallel engagement for movement transversely of said line of action, each carrier plate being adapted to carry one handle from a withdrawn position in which this carrier plate receives a handle from a corresponding one of the magazines and an extended position in which this handle is in one of said respective positions at a side of the float piece; and means adapted to move the carrier plates between said withdrawn and extended positions.

4. In apparatus for applying plastic handles to plastic bag stock, the improvement wherein the apparatus includes a combination cutting and welding mechanism comprising: a float piece having a central main portion with parallel sides and a pair of relatively thin wing members dependent from the main portion in a substantially common plane lying between and parallel to said parallel sides, the float piece being adapted to be positioned inside the bag stock; a head movable axially along a predetermined line of action perpendicular to said sides of the float piece; guide means coupled to the head to restrain the head to move axially; actuator means coupled to the head for moving the head axially; heating elements coupled to the main portion of the float piece; electrical contacts coupled electrically to the heating elements, these elements having respective shapes corresponding to the shapes of said handles and being located about said line of action so that upon heating the heating elements and energising said actuator to apply forces to press the sides of the bag stock between respective handles and heating elements, the respective bag stock sides and handes are welded to one another; said head comprising: a cutter for piercing the bag sides inside the handles; a retainer slidably mounted for axial movement relative to the cutter; means adapted to bias the retainer axially relative to the cutter; electrically conductive shoes aligned axially with said electrical contacts; and a back stop aligned with the end piece;

said actuator means being operable to move the head between a withdrawn position in which the head is clear of the bag stock and handles, and an extended position in which the cutter projects through both sides of the bag stock and the retainer and back stop apply compressive forces which hold the handles in contact with the bag sides so that the bag sides are then in thermal engagement with the heating elements to thereby weld the bag sides to the handles, the conductive shoes then being in engagement with the respective electrical contacts to complete an electrical circuit for heating the heating elements.

5. Apparatus for applying plastic handles to tubular plastic bag stock, the apparatus comprising:

a drive mechanism adapted to feed the bag stock through the apparatus intermittently in discrete lengths, each one of said lengths corresponding to the length of a bag;

a float piece adapted to be positioned inside the bag stock;

means restraining the float piece to remain in a predetermined position as the bag stock is fed over the float piece by the drive mechanism;

a handle transport mechanism adapted to feed pairs of handles to respective positions one at either side of the float piece immediately adjacent respective outer sides of the bag stock, the handles then being disposed similarly about an axis perpendicular to the float piece;

a clamping mechanism adapted to move axially along said axis to apply a compressive force whereby the bag stock is clamped between respective handles and the float piece;

a cutter movable along said axis to pierce the bag stock inside said handles;

actuator means adapted to move said clamping mechanism and said cutter assembly in sequence to first create said compressive force and then to pierce the bag stock;

the float piece having a central main portion adapted to combine with said restraining means and a pair of relatively thin wing members dependent from the main portion in a substantially common plane lying perpendicularly to said axis; and further comprising: heating elements; electrical contacts coupled electrically to the heating elements; the heating elements having respective shapes corresponding to the shapes of said handles and being located about said axis so that upon heating the heating elements and energising said actuator means to apply forces to press the sides of the bag stock between respective handles and heating elements the respective bag stock sides and handles are welded to one another; and electrically conductive shoes coupled to the cutter and aligned axially with said electrical contacts so that when the cutter is moved to pierce the bag stock, the conductive shoes are in engagement with the respective electrical contacts to complete an electrical circuit for heating the heating elements.

6. Apparatus as claimed in claim 5 and further comprising: a finished station; and an adjuster coupled to the finishing station and operable to move the finishing station along a path followed by the bag stock whereby the distance along this path between the combination cutting and welding mechanism and the finishing station can be varied to ensure proper registration of the finishing station relative to the handles applied to the bag stock.

7. Apparatus as claimed in claim 5 in which the handle transport mechanism comprises: a pair of aligned magazines adapted to contain a plurality of the handles in face-to-face arrangement; a pair of carrier plates in parallel arrangement for movement transversely of said axis, each carrier plate being adapted to carry one handle from a withdrawn position in which this carrier plate receives a handle from a corresponding one of the magazines and an extended position in which this handle is in one of said respective positions at a side of the float piece; and means adapted to move the carrier plates between said withdrawn and extended positions.

8. An apparatus for applying plastic handles to plastic bag stock, the improvement wherein the apparatus comprises:

a float piece adapted to be positioned inside the bag stock;

a clamping mechanism adapted to move axially along said axis to apply a compressive force whereby the bag stock is clamped between respective handles and the float piece;

a cutter movable along said axis to pierce the bag stock inside said handles;

actuator means adapted to move said clamping mechanism and said cutter axially in sequence to first create said compressive force and then to pierce the bag stock;

the float piece having a central main portion adapted to combine with said restraining means and a pair of relatively thin wing members dependent from the main portion in a substantially common plane lying perpendicularly to said axis; and further comprising: heating elements, electrical contacts coupled electrically to the heating elements; the heating elements having respective shapes corresponding to the shapes of said handles and being located about said axis so that upon heating the heating elements and energising said actuator means to apply forces to press the sides of the bag stock between respective handles and heating elements, the respective bag stock sides and handles are welded to one another; and electrically conductive shoes coupled to the cutter and aligned axially with said electrical contacts so that when the cutter is moved to pierce the bag stock, the conductive shoes are in engagement with the respective electrical contacts to complete an electrical circuit for heating the heating elements.

9. Apparatus as claimed in claim 1 in which the back stop comprises a movable end piece for movement axially in alignment with said line of action and means adapted to move the end piece towards the combination cutting and welding mechanism when the head is moved towards the float piece to thereby apply said compressive forces.

10. Apparatus as claimed in claim 4 in which the back stop comprises a movable end piece for movement axially in alignment with said line of action and means adapted to move the end piece towards the combination cutting and welding mechanism when the head is moved towards the float piece to thereby apply said compressive forces.

11. Apparatus as claimed in claim 1, in which the cutter severs pieces of bag stock from the respective sides of the tubular bag stock and in which the combination cutting and welding mechanism further includes an ejection mechanism comprising: a plate movable inside the cutter between a first position within the cutter and a second position slightly forwardly of the cutter for pushing said pieces of bag stock out of the cutter; and means operable to move the plate axially from the first to the second position after the cutter has severed both pieces and from the second to the first position before the cutter commences movement axially to sever a further pair of said pieces of the bag stock.

12. Apparatus as claimed in claim 1, in further comprising: electrical switch means operable by movement of the head to close an electrical circuit for supplying energy to the conductive shoes and hence to the contacts and the heating elements after mechanical contact has been made between the conductive shoes and the contacts to thereby reduce the possibility of arcing between the conductive shoes and the contacts.

13. Apparatus as claimed in claim 1, in the float piece further comprises strippers surrounding the heating elements and resiliently biassed into a normal position proud of the heating elements, the strippers being deflected into coplanar alignment with the heating elements when said compressive forces are applied and upon release of these forces the strippers move back to said proud position to thereby release the bag stock from the heating elements in the event that the bag stock has become attached to the heating elements.

14. An apparatus as claimed in claim 4, a further improvement wherein the float piece further comprises strippers surrounding the heating elements and resiliently biassed into a normal position proud of the heating elements, the strippers being deflected into coplanar alignment with the heating elements when said compressive forces are applied and upon release of these forces the strippers move back to said proud position to thereby release the bag stock from the heating elements in the event that the bag stock has become attached to the heating elements.

15. Apparatus as claimed in claim 1, in the cutter severs pieces of bag stock from the respective sides of the tubular bag stock and in which the combination cutting and welding mechanism further includes an ejection mechanism comprising: a plate movable inside the cutter between a first position within the cutter and a second position slightly forwardly of the cutter for pushing said pieces of bag stock out of the cutter; and means operable to move the plate axially from the first to the second position after the cutter has severed both pieces and from the second to the first position before the cutter commences movement axially to sever a further pair of said pieces of bag stock; and in which the apparatus further comprises: electrical switch means operable by movement of the head to close an electrical circuit for supplying energy to the conductive shoes and hence to the contacts and the heating elements after mechanical contact has been made between the conductive shoes and the contacts to thereby reduce the possibility of arcing between the conductive shoes and the contacts; and in which the float piece further comprises strippers surrounding the heating elements and resiliently biassed into a normal position proud of the heating elements, the strippers being deflected into coplanar alignment with the heating elements when said compressive forces are applied and upon release of these forces the strippers move back to said proud position to thereby release the bag stock from the heating elements in the event that the bag stock has become attached to the heating elements.

* * * * *